May 14, 1929.   D. K. ROSE   1,712,848
APPARATUS FOR DIAGNOSING BLADDER CONDITIONS
Filed April 21, 1926   2 Sheets-Sheet 1
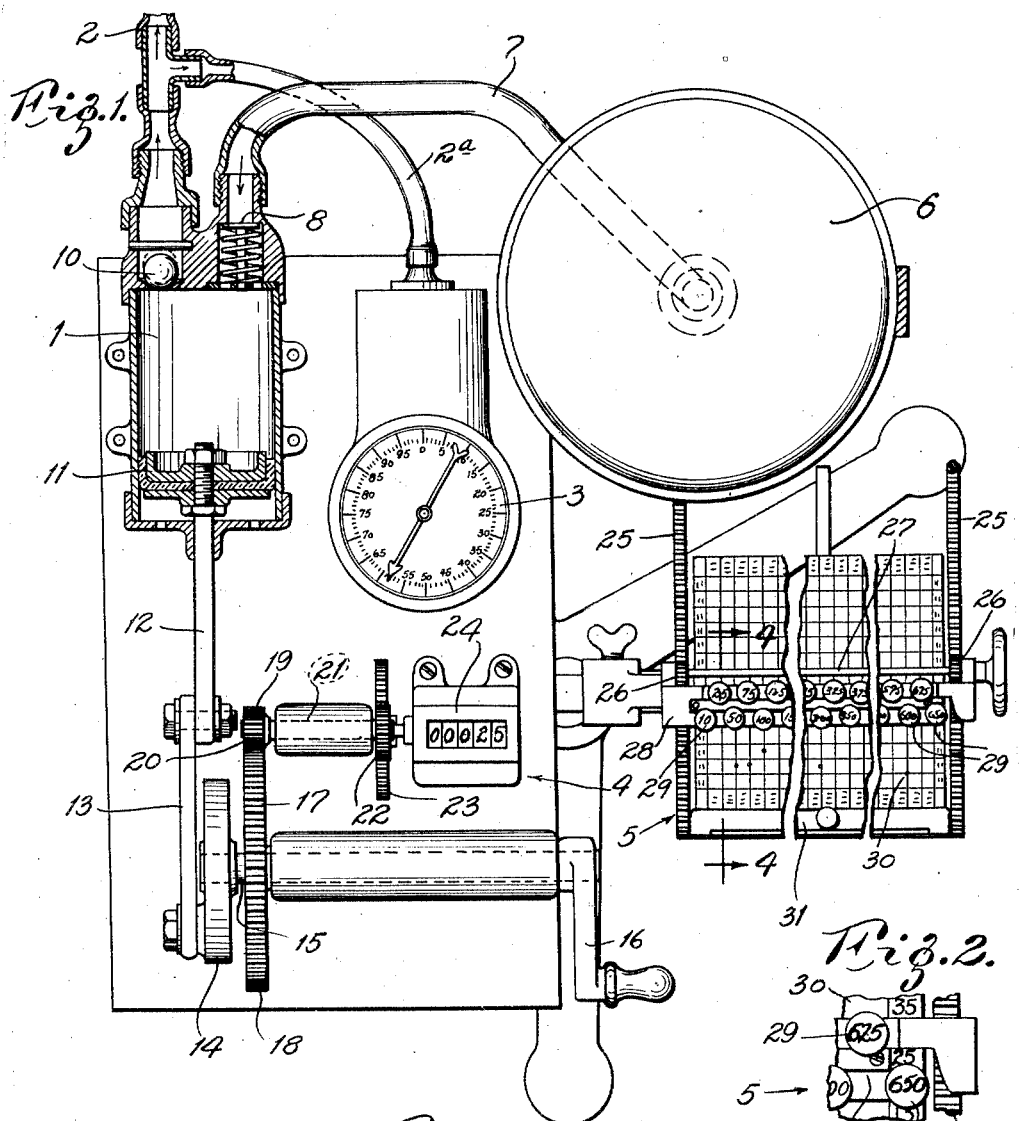
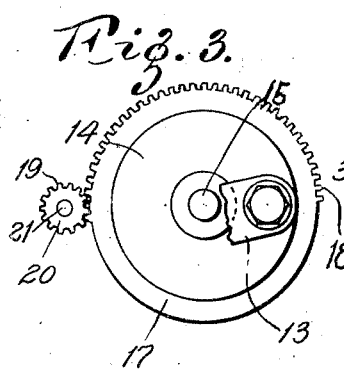
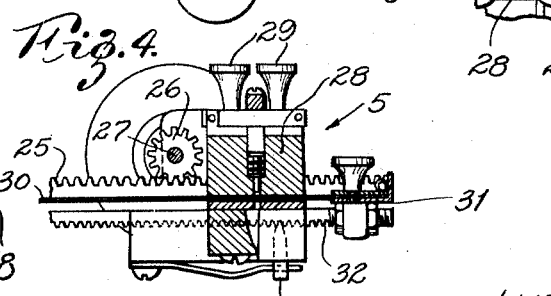
INVENTOR:
Dalton K. Rose,
HIS ATTORNEYS.

Patented May 14, 1929.

1,712,848

UNITED STATES PATENT OFFICE.

DALTON K. ROSE, OF ST. LOUIS, MISSOURI, ASSIGNOR TO JOSEPH H. ZUMBALEN, OF ST. LOUIS, MISSOURI.

APPARATUS FOR DIAGNOSING BLADDER CONDITIONS.

Application filed April 21, 1926. Serial No. 103,414.

My invention relates to apparatus for diagnosing bladder conditions and has for its principal object an apparatus by which abnormal or diseased conditions of the bladder may be accurately noted and diagnosed. The invention consists principally in an apparatus adapted to force liquid into the bladder, means for simultaneously observing the pressure in the bladder and means for measuring the amount of fluid introduced into the bladder. The invention further consists in the apparatus for diagnosing bladder conditions and in the parts and combinations and arrangements of parts hereinafter described and claimed.

In the accompanying drawing,

Fig. 1 is a plan view of the apparatus embodying my invention;

Fig. 2 is a detail view of a portion of the recording or chart-making portion of the apparatus;

Fig. 3 is a detail view showing a portion of the means for operating the pump and the registering device forming part of the apparatus;

Fig. 4 is a detail sectional view of the recording or chart-making apparatus taken on the line 4—4 in Fig. 1.

In diagnosing bladder conditions, it is customary to make observations of the bladder wall by means of a cystoscope. I have found that these observations do not always give the information desired, and I have discovered that by introducing measured quantities of fluid into the bladder and simultaneously noting the resulting pressure, conditions of the bladder and its controlling nerves may be accurately noted. According to this process, I introduce a known quantity of fluid into the bladder and at once measure the resulting pressure by means of a pressure gage connected with the bladder or with the supply line through which liquid passes into the bladder. This pressure and quantity of fluid are noted on a chart as "Bladder wall pressure". Then the patient is instructed to take a deep breath and the resulting pressure and quantity of fluid are noted as the "Respiratory pressure". Then he is instructed to strain the abdominal muscles and the resulting pressure and quantity of fluid are noted as "Abdominal pressure". An additional measured quantity of fluid is then introduced into the bladder and the foregoing three pressures noted. The operation is repeated until under all the circumstances of the particular case the full capacity of the bladder has been reached. The patient is instructed to signify when he first feels the desire to void and this point is also noted, as indicated by the asterisks on the charts.

The taking of the "Respiratory pressure" may be dispensed with; but this pressure is found to be of considerable interest, particularly as it gives a check on the condition of the diaphragm.

Figure 5:
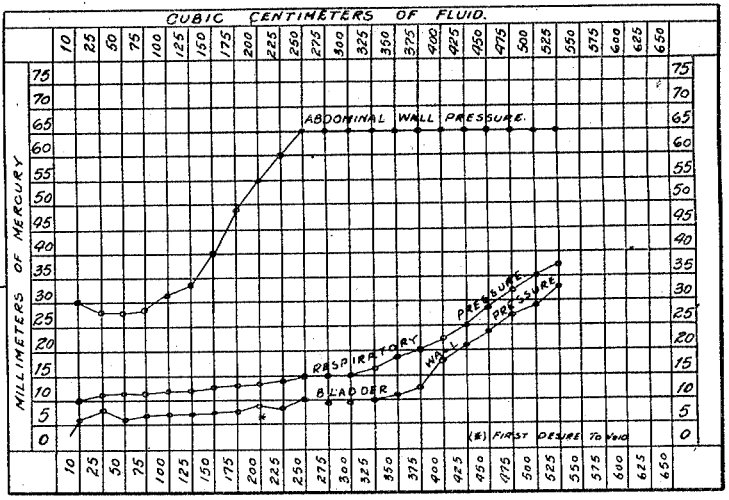
Figs. 5, 6 and 7 are typical charts made by the recording apparatus, showing different bladder conditions.

The pressure curves for different people will, of course, vary with conditions of the bladder. Thus, Fig. 5 shows a type of normal curve. The bladder wall pressure and the respiratory pressure both increase gradually with the introduction of larger quantities of fluid into the bladder, the two curves being quite similar in appearance. After the first desire to void, the pressure increases more rapidly. The abdominal wall pressure drops slightly in the beginning, builds up quite rapidly for a time and then remains fairly constant thereafter.

Figure 6:
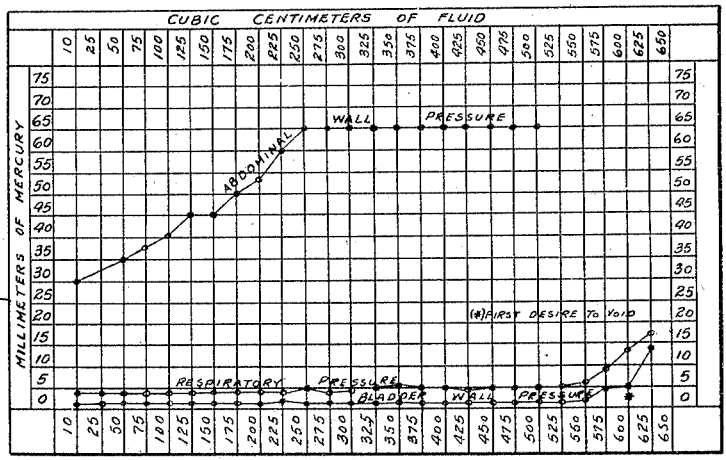

Fig. 6 shows a hypoirritable and a strophic bladder wall condition. In this case, the bladder wall pressure curve and the respiratory pressure curve rise very slowly. The abdominal wall pressure curve is much more nearly normal than the other two curves.

Figure 7:
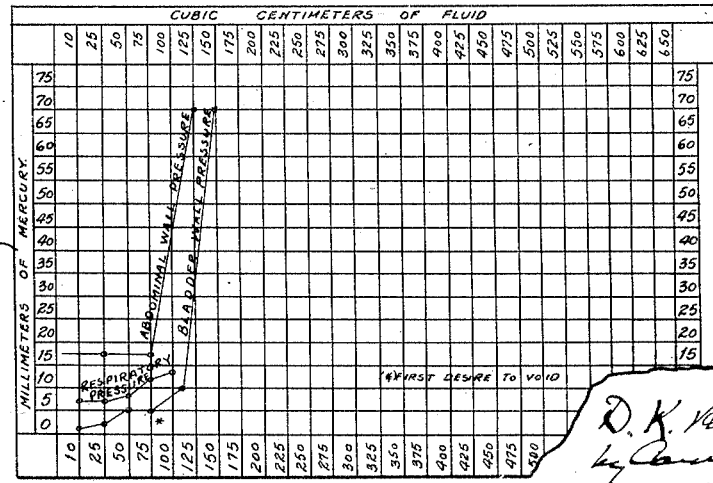

Fig. 7 shows a hyperirritable and hypertrophic bladder wall. In this case, the desire to void is felt after a very small quantity of fluid has been introduced and the three pressure curves at once rise very abruptly and a very high pressure is reached with a comparatively small quantity of fluid in the bladder.

The apparatus shown in the drawings for carrying out the foregoing diagnosing process comprises a pump 1, a supply line 2 leading from said pump to the bladder of a patient, a pressure gage 3 connected with said supply line, means 4 for registering the quantity of fluid passing into the bladder, and a recording device (indicated generally by the numeral 5) for charting the quantities of fluid and the resulting pressures.

A container 6 of fluid (for example, sterile water) is connected by a suitable tube 7 to the inlet valve 8 of the pump cylinder 1, a spring-pressed ball-check valve being provided to prevent water from flowing from the pump back to the supply tank 6. A similar ball-check valve 10 is provided to prevent fluid from flowing back from the bladder supply line 2 into the pump 1. In the pump cylinder 1 is a piston 11 whose projecting end 12 is connected to a link 13 that is pivotally secured to an eccentric 14 that is mounted on a shaft 15 and provided with a handle 16 for turning it. Also mounted on said shaft 15 is a wheel 17 that has gear teeth 18 extending through about half its periphery and adapted to mesh with the teeth 19 of a pinion 20 mounted on a shaft 21 at whose other end is a pinion 22 meshing with a gear 23 connected with a suitable counting or registering apparatus 24. Such registering apparatus 24 is arranged to indicate cubic centimeters of fluid. The details of such mechanism form no part of the present invention and are not shown in the drawing. The gear teeth 18 of the wheel 17 are arranged so that the registering device 24 operates only on the forward or working stroke of the piston 11.

Connected with the supply line 2 that leads to the bladder is the pressure gage 3 (which may be of any suitable construction) so that the pressure in the bladder may be noted at any time.

A chart making device 4 may conveniently be provided. The device illustrated comprises a pair of parallel racks 25 with which mesh pinions 26 secured on a shaft 27. Mounted on said shaft 27 is a frame 28 in which are disposed a plurality of spring pressed punch members 29 adapted to punch holes in a sheet 30 held by a suitable clamp member 31 between the two racks 25. Another rack 32 is adapted to be engaged by a spring pressed pawl or detent 33 mounted on said frame 28. Said rack 32 is so made that the movement of the detent 33 from one tooth to the next indicates one cubic centimeter of fluid. Thus auditory as well as visual means are provided for use in making the chart.

The chart 30 is provided with series of numbers extending along the edges and indicating pressures, and with series of numbers extending across the top and bottom indicating cubic centimeters of fluid. Thus the punch-carrying frame 28 is moved until it registers (as shown in Fig. 4) with the pressure indicated on the pressure gage and then the punch member 29 for the number of cubic centimeters of fluid that are in the bladder at that time is pressed, thus punching a hole that indicates the number of cubic centimeters and the pressure for such quantity of fluid.

Obviously numerous changes may be made in the apparatus above described and I do not wish to be limited to the construction shown.

What I claim is:

1. An apparatus of the kind described comprising a pump, a supply line leading therefrom and adapted to be connected with the bladder of a patient, a pressure gaging device connected with said supply line, and means for registering the quantity of fluid passing from said pump.

2. An apparatus of the kind described comprising a pump, a supply line leading therefrom and adapted to be connected with the bladder of a patient, a pressure gaging device connected with said supply line, means for measuring the quantity of fluid passing from said pump, and means for charting the pressures noted on said pressure gaging device.

3. An apparatus of the kind described comprising means for forcing fluid into the bladder of a patient in measured quantities, means for indicating the amount of fluid so introduced, means for simultaneously gaging the resulting bladder pressure, and means for charting the quantity of fluid and the corresponding bladder pressure.

Signed at St. Louis, Missouri, this 15th day of April, 1926.

DALTON K. ROSE.